United States Patent [19]  
Boucher et al.

[11] 4,107,682  
[45] Aug. 15, 1978

[54] SYSTEM FOR OVERCOMING THE EFFECT OF ELECTRONIC COUNTERMEASURES

[75] Inventors: Robert J. Boucher, Los Angeles; Robert L. Brackney, Jr., Whittier, both of Calif.

[73] Assignee: Hughes Aircraft Company, Culver City, Calif.

[21] Appl. No.: 629,864

[22] Filed: Apr. 5, 1967

[51] Int. Cl.² .......................... G01S 7/36; G01S 9/22
[52] U.S. Cl. ................................ 343/16 M; 343/18 E
[58] Field of Search ........................... 343/16 M, 18 E

[56]  References Cited  
U.S. PATENT DOCUMENTS

| 3,221,328 | 11/1965 | Isch | 343/16 SD |
| 3,283,322 | 11/1966 | Houda et al. | 343/16 SD |
| 3,838,423 | 9/1974 | DiMatteo | 343/18 E X |
| 3,859,661 | 1/1975 | Ruvin et al. | 343/18 E |
| 4,042,927 | 8/1977 | Helms | 343/18 E |
| 4,044,359 | 8/1977 | Applebaum et al. | 343/18 E X |

Primary Examiner—T.H. Tubbesing  
Attorney, Agent, or Firm—Walter J. Adam; W. H. MacAllister

[57] ABSTRACT

An electronic counter counter-measure (ECCM) system for overcoming the effect of sidelobe repeater or stand off jammer type electronic counter measures (ECM). A primary monopulse type antenna is divided into four quadrants for transmission and reception with the received sum and difference signals being combined in a ferrite modulator. When ECM is detected, the reception pattern is switched so that only the difference signals from the modulator are utilized for the received energy. The power at the receiver in response to only difference signals, relative to the conventional power, allows a threshold to be established to allow blanking of the radar display in a narrow azimuth region about the true azimuth position of the jamming source. The displayed azimuth region that is affected by the jammer, is reduced to only a few degrees on either side of the jammer position.

7 Claims, 9 Drawing Figures

SYSTEM FOR OVERCOMING THE EFFECT OF ELECTRONIC COUNTERMEASURES

BACKGROUND OF THE INVENTION

This invention relates to a radar system and more particularly to electronic counter countermeasure means and a method of overcoming the effect of certain types of electronic countermeasures.

The great advances, made in the art of radar, inevitably led to the development of electronic countermeasures, known as ECM's, the primary purpose of which is to reduce and often destroy the effectiveness of even the most sophisticated radar system in detecting the locations of targets. One type of ECM is often referred to as the inverse gain sidelobe repeater. Basically, it is an electronic system which is carried aboard a target, such as an aircraft, which attempts to prevent a search radar from locating its position in azimuth. The repeater in essence includes a receiver which senses the energy patterns transmitted by the searching radar system and retransmits them, so that when they are received, they display the range, R, of the target but not its azimuth, A. That is, the target appears as if it is in all azimuths and therefore its azimuth location cannot be determined.

Another type of ECM is the standoff jammer. Unlike the inverse gain sidelobe repeater, the standoff jammer is not aboard an actual target but rather aboard another plane which generally accompanies a formation of targets. Its function is to generate electrical noise so that a relatively wide azimuth band on the display of the search radar is filled with noise signals which prevent the accurate detection of any targets therein in either range or azimuth. Alternately stated, the standoff jammer smears the radar display in a given azimuth band for all ranges to obscure the locations of any targets therein. Herebefore, the effect of a standoff jammer could not be countered effectively.

To overcome the effect of the inverse gain sidelobe repeater, a secondary or "guard" radar receiver with a separate antenna is employed, in addition to the primary radar system with its antenna. The output of the "guard" receiver is combined with the output of the receiver of the primary radar system. A system of detection logic is used to determine whether a received signal originated at the true angular location or azimuth of an ECM-carrying aircraft. Such a technique has been found to be quite complex and very costly since it is based on the need of an additional radar receiver and antenna.

SUMMARY OF THE INVENTION

It is a primary object of the present invention to provide new means for and a method of reducing the effects of certain types of ECM's on target information, displayed in a receiver of a primary search radar system.

A further object is to provide a system for countering the effect of certain types of ECM's without the need for a secondary radar receiver with a secondary antenna.

Another object is the provision of a modified primary search radar system in which simple microwave devices are incorporated which are used to modify the mode of operation of the conventional primary search radar system so that the effect of certain types of ECM's is countered without the need for a separate receiver and antenna.

Still a further object is to provide a new, relatively simple, method of operating a modified conventional primary search radar system to counter the effect of inverse gain sidelobe repeater and standoff jammer type ECM's.

These and other objects of the invention are achieved by incorporating in an otherwise conventional primary search radar system, microwave switching devices, which provide switching capabilities, so that in a conventional mode of operation, the antenna pattern for reception is the same as for transmission, while differing from that for transmission upon the detection of the presence of either an inverse gain sidelobe repeater or standoff jammer type ECM. The invention is based on a substantiated assumption that the transmission of an inverse gain sidelobe repeater is programmed on the assumption that the primary search radar uses the same antenna pattern for reception as for transmission. However, if the antenna pattern for reception and transmission are not the same, it is possible to observe characteristics of the repeater's transmission which reveal the angular location of its source. These basic principles are also applicable to counter the effect of a standoff jammer.

In accordance with the teachings of the invention, the primary search radar system is initially operated in a conventional search mode. In one embodiment, the primary antenna is divided into four quadrants. During transmission, all four quadrants transmit energy in phase, resulting in a narrow beam of radiation which is symmetrical about the antenna axis. Then, during reception, the received signals or energy are processed in several different ways. Signals from all four quadrants are added in phase to provide a "sum" signal, a signal used in the receiver for target detection and for measurement of target range and velocity. Signals from the upper two quadrants are subtracted from the lower two quadrants, or vice versa, to derive an elevation difference signal, while signals from the two on the left are subtracted from those on the right, or vice versa, to provide an azimuth difference signal. The azimuth and elevation difference signals are then processed through a ferrite modulator to produce an error signal which is then processed with the sum signal in a variable coupler by a technique known as "silent lobing" to provide a composite error signal which is used in the system to reduce the antenna target tracking error. Such a mode of reception may be thought of as a reception on the "sum" pattern.

Once the presence of a repeater is detected by the receiver display, displaying a target at a fixed range but in all azimuths, the reception pattern of the system is switched so that only the difference signals are used for reception. The power at the receiver when receiving only difference signals, relative to the power received in a conventional mode, is such that a threshold level can be established, as a result of which the beam of the radar display is blanked only in a narrow azimuth range about the true azimuth position of the repeater. As a result, the location of the blanked beam indicates the repeater's true azimuth position. A similar technique is employed to counter the effect of a standoff jammer type ECM.

BRIEF DESCRIPTION OF DRAWINGS

The novel features that are considered characteristic of this invention are set forth with particularity in the appended claims. The invention will best be understood from the following description when read in connection with the accompanying drawings, in which:

DESCRIPTION OF PREFERRED EMBODIMENT

Figure 1:
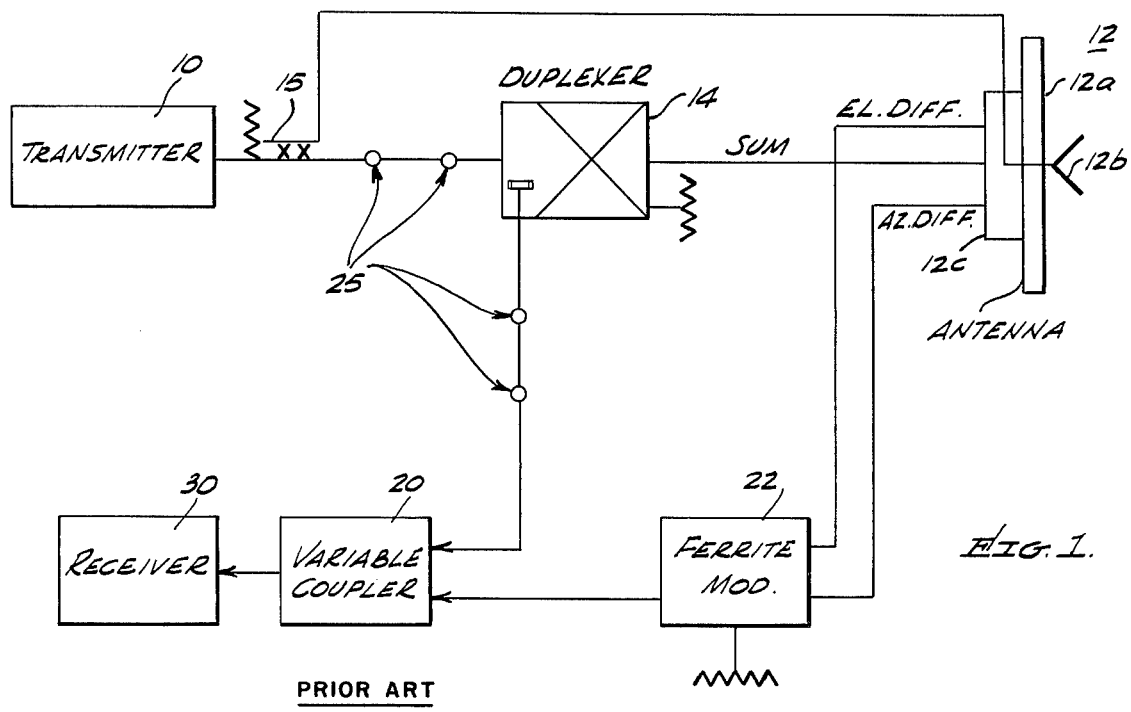
FIG. 1 is a block diagram of a prior art conventional type search radar system.

Reference is now made to FIG. 1 which is a simplified block diagram of a conventional type primary search radar system of the prior art, which does not include means capable of countering the effects of certain types of ECM's. Basically, the system includes a transmitter 10 which is coupled to an antenna system, generally designated by numeral 12, through a duplexer 14. System 12 is assumed to include a monopulse type antenna 12a divided into four quadrants and a horn, designated by numeral 12b. The monopulse antenna 12a may be a conventional slot type planar array with the horn 12b being an opening or aperture at the center of the array, for example. The horn or aperture 12b is oriented so that the energy is cross polarized relative to that of the planar array. It is to be noted that the antenna system is not to be limited to a planar array but other antenna arrangements such as a parabollic antenna with a monopulse feed and cross polarized aperture may also be utilized in accordance with the principles of the invention. Also, within the scope of the invention, the horn may have positions other than in the center of the array or parabollic dish. The system 12 is also assumed to include an antenna control stage 12c, in which signals are coupled to each of the quadrants with the phases of the signals in the various quadrants of antenna 12a during transmission and reception being controlled. The control stage 12c may be formed of a conventional sum and difference network, for example.

Briefly, during transmission, signals from transmitter 10 are supplied through duplexer 14 to stage 12c in which the energy is controlled so that all four quadrants of antenna 12a transmit energy in phase, resulting in a narrow beam of radiation which is symmetrical about the antenna axis. Also, during transmission, some energy from transmitter 10 is directed to horn 12b through an impedance adjustable microwave coupler, designated in FIG. 1 by numeral 15. During reception, the energy or signals received in the four quadrants are operated upon in the control stage 12c. The signals from all four quadrants of antenna 12a are added in phase to provide a sum signal which is supplied from stage 12c to a variable coupler 20 through duplexer 14. At the same time, stage 12c operates upon the energy received in the four quadrants by subtracting, the signals from the upper two quadrants from those from the lower two quadrants, or vice versa, to provide an elevation difference signal which is supplied to a ferrite modulator 22. Other types of modulators such as mechanical modulators may be utilized in accordance with the principles of the invention. Also, 12c subtracts the signals from the two quadrants on the left side of the antenna 12a from those received in the two quadrants on the right to derive an azimuth difference signal which is also supplied to the ferrite modulator. Thus, during a conventional reception mode, three signals are supplied from 12c. The sum is supplied through duplexer 14 to the variable coupler 20, while the two elevation and azimuth difference signals are supplied directly to the ferrite modulator 22. The radar system may, in addition, include a plurality of rotary joints generally designated by numeral 25, in order to control the interconnections between duplexer 14 and transmitter 10 and variable coupler 20 during transmission and reception, respectively. In operation, the azimuth and elevation difference signals are processed in the ferrite modulator, providing a combined azimuth and elevation difference signal to the variable coupler which is also supplied with the received sum signal. Within the variable coupler, the two signals are combined by a technique known in the art as "silent lobing" to provide a composite error signal to a receiver 30, for display purposes, as well as, to control the antenna so as to reduce the antenna tracking error to substantially zero.

Figure 2A:
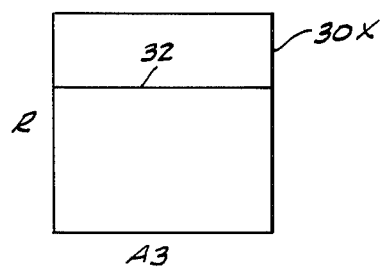
FIGS. 2(a) and 2(b) are front views of a display surface of a display device in the radar receiver.

It has been found that when such a radar system transmits and receives signals as hereinbefore described, it is greatly affected by the presence of either an inverse gain sidelobe repeater or a standoff jammer type ECM. The effects of the repeater and jammer on the system may best be diagrammed in conjunction with FIGS. 2(a) and 2(b) respectively. The latter two mentioned figures, represent the display surface 30x of a display device (not shown), assumed to be incorporated in receiver 30. The vertical axis of the surface represents range, (R), or range rate, (Ṙ), while the horizontal axis represents azimuth, (Az).

The inverse gain sidelobe repeater, unless countered, will unblank an electron beam in the display device to produce a line 32 on the display surface at a range value which represents the actual range of the repeater but in all azimuths. Thus, even though the range of the repeater can be determined, its azimuth location with respect to the antenna axis cannot be ascertained and therefore the repeater as hereinbefore discussed, representing an actual target to be searched and tracked, cannot be located. On the other hand, the effect of a standoff jammer is one in which a portion of the display surface 30x in all ranges is covered by meaningless lines so that any targets which may be located in the particular azimuth region cannot be accurately located for tracking purposes.

Figure 3:
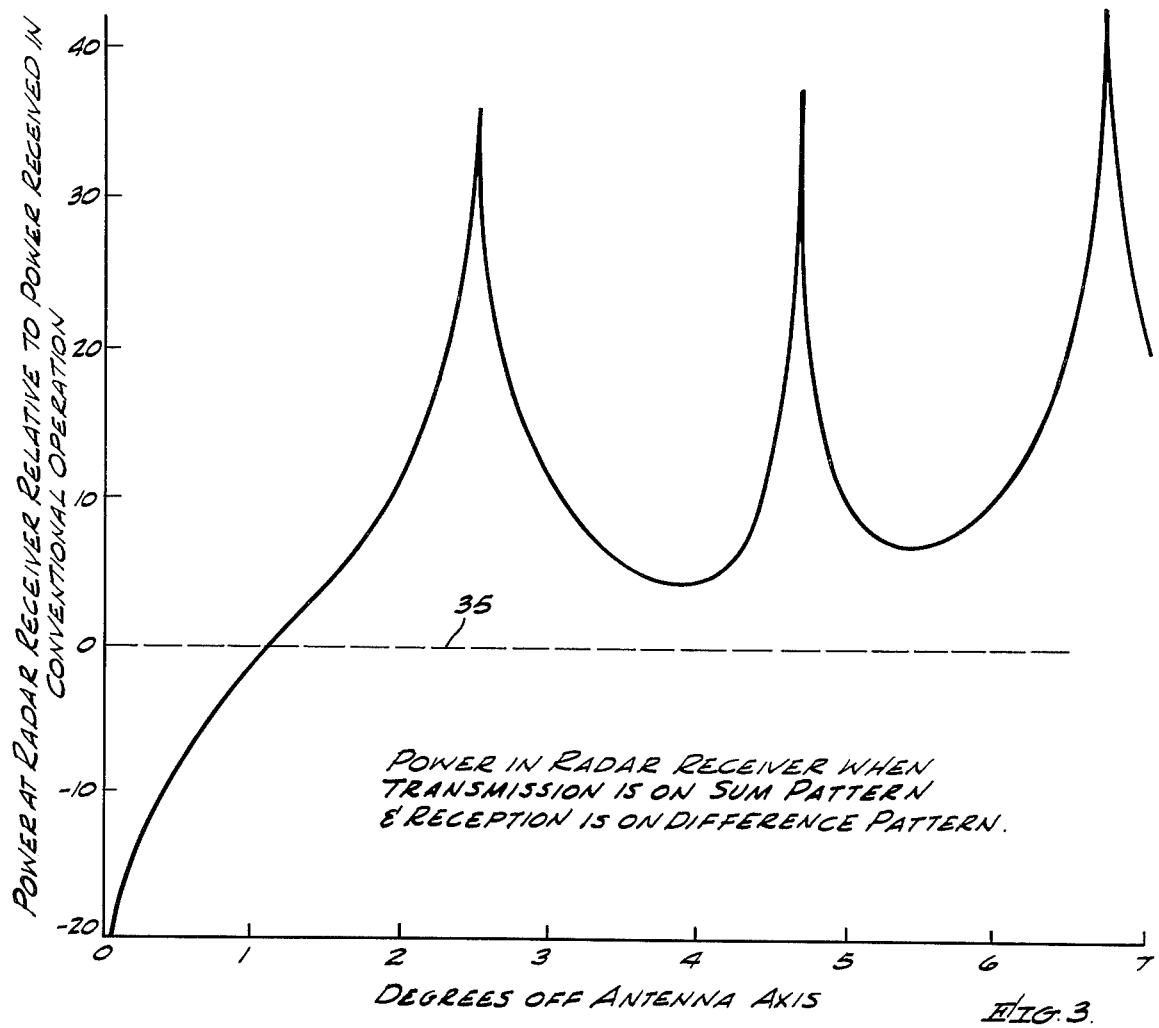
FIG. 3 is a diagram of received power vs. degrees off antenna axis when transmission is on a sum pattern and reception on the difference patterns, relative to reception on the sum and difference patterns.

In attempting to counter these types of ECM's, without resort to a secondary radar system, it has been found that if, instead of reception on the sum pattern plus the difference patterns, reception is limited to the difference patterns, the power at the radar receiver relative to power received in a sum reception pattern is such that a threshold level can be established, whereby the ambiguity in the display created by the ECM's is eliminated. Referring to FIG. 3, therein power at the radar receiver when transmission is on the sum pattern and reception is on the difference pattern relative to the power received with a sum pattern, is diagrammed in db along the ordinate. The abscissa represents degrees off the antenna axis. From the example diagrammed in FIG. 3, it is seen that when the repeater is one degree or less off the antenna axis, the power received in the receiver is less than that received in conventional operation.

Figure 4A:
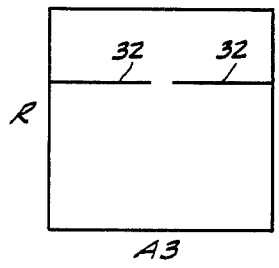
FIGS. 4(a) and 4(b) are front views of a display surface of a display device representing the countering effect, achieved by the teachings of the present invention.

This most significant relationship is utilized in the present invention. In accordance with the teachings disclosed herein, upon detecting a repeater or jammer, the system is switched to receive the difference patterns and a threshold level is established in the receiver so that only when the received power is above such level is the beam of the display device unblanked. For example, in conjunction with the example diagrammed in FIG. 3, a threshold level designated by dashed line 35 may be established so that only when the received power is equal to or greater than the power received in a conventional reception operation is the beam unblanked. As a result, the beam will be blanked only in an azimuth range representing 1.1° on either side of the antenna axis when beamed toward the repeater. Such a presentation is represented in FIG. 4(a), wherein the break in the line 32 represents the azimuth of the repeater. And since the range thereof is available, its true location is detected. Thus, its effect is overcome or countered.

Figure 2B:
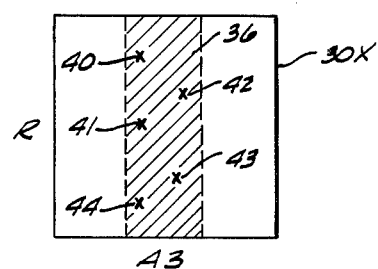

A similar countering result occurs when the ECM is a standoff jammer. As previously stated, the effect of the jammer as diagrammed in FIG. 2(b) is to unblank the beam over a wide azimuth range of the display for all ranges, represented in FIG. 2(b) by the dashed area 36. As a result, any targets, such as those indicated by X marks 40–44, cannot be located. However, by receiving on the difference patterns and establishing a beam unblanking threshold level, the azimuth range affected by the jammer can be greatly reduced to a degree or less off the antenna axis, so that the targets 40–44 can be accurately displayed. Such display is diagrammed in FIG. 4(b).

Figure 4B:
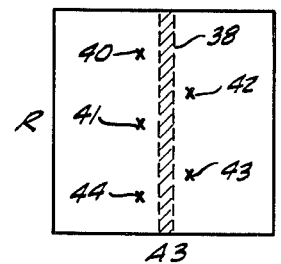

As seen from FIG. 4(b), the azimuth range affected by the standoff jammer is greatly reduced so that the locations of targets 40–44 are clearly displayed. Only targets located in a direct line between the radar system and the jammer represented by area 38 may be affected. However, since the jammer is not stationary, such targets will be revealed some time during the search operation.

Figure 5:
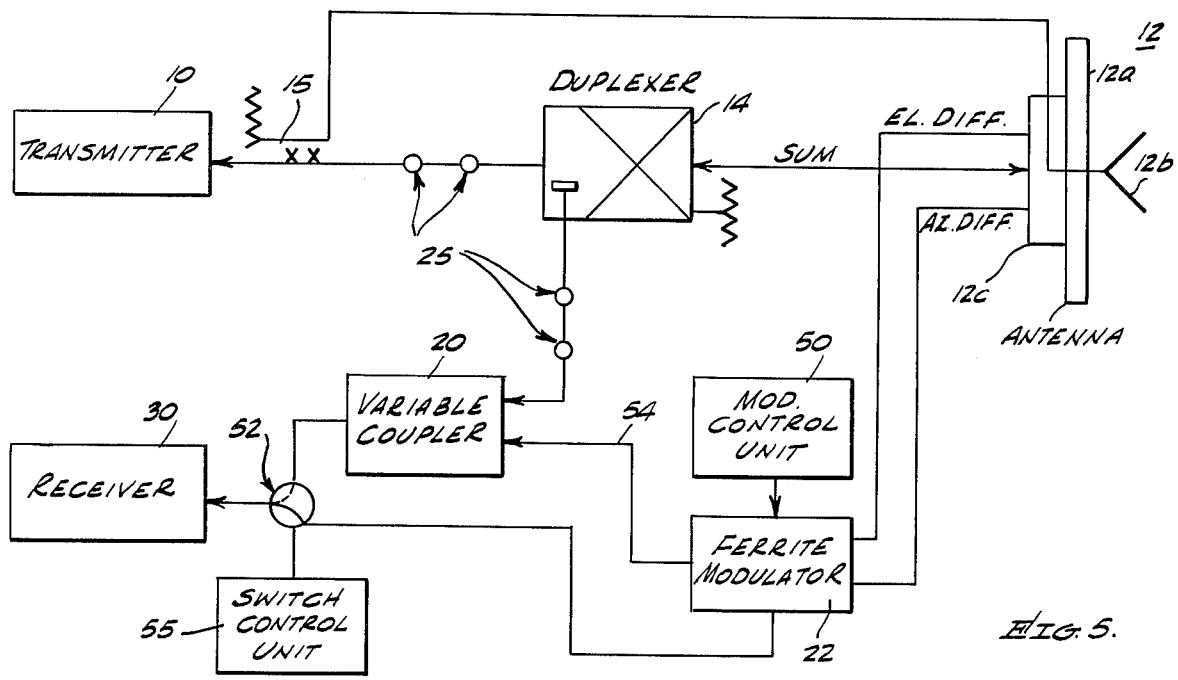
FIG. 5 is a block diagram of a conventional radar system, modified in accordance with one embodiment of the invention.

To provide the primary search radar system with the capability to switch from one mode of reception, that is, the sum pattern reception herebefore referred to as the conventional operation, to an ECM countering mode of reception, in accordance with the teachings of the invention, control and switching means are provided which may best be explained in conjunction with FIG. 5. In the latter-mentioned figure elements, like those diagrammed in FIG. 1, are designated by like numerals. The added means comprise a modulator control unit 50 and a microwave switch 52. In the conventional mode of reception, i.e. reception on the sum pattern, the unit 50 does not affect the modulator 22, so that it supplies to coupler 20, via a transmissiion line 54, the combined elevation and azimuth difference signals produced therein. Also, the switch 52 is in the position, represented by the dahsed line therein, so that the coupler 20 is connected to the receiver 30 as in the arrangement in FIG. 1.

However, once the presence of a repeater or standoff jammer is indicated, the modulator control unit is actuated to control modulator 22 to send to switch 52, only the azimuth or elevation difference signals supplied thereto, via a transmission line 54. Also, switch 52 is actuated by a switch control unit 55 to switch to the position, indicated by the solid line therein. As a result, the coupler 20 which receives the sum pattern through duplexer 14 is disconnected from the receiver and only the difference patterns from the modulator 22 are sent to the receiver. The modulator control unit 50 removes the modulation from the difference signals applied to the modulator 22 and passes only the unmodulated azimuth difference signal for example, to the coupler 20 and to the switch 52.

Thus by providing switch 52 and units 50 and 55, the system reception capability is doubled, enabling it to operate in either a conventional mode in which reception is on the sum pattern or in a counter ECM mode in which reception is on difference (azimuth or elevation) patterns. Such a capability eliminates the need of a secondary radar receiver with its separate antenna, thus greatly reducing the complexity and cost of countering the effect of an inverse gain sidelobe repeater, as well as, provide means for countering a standoff jammer which in the absence of the invention could not be countered. It should further be pointed out that in the present invention, since the transmission pattern is not altered, the countering of the repeater is accomplished without revealing that a counter countermeasure operation is being used.

It has been discovered that though countering the ECM's herebefore discussed may best be accomplished be receiving on the difference pattern, the invention need not be limited thereto. The countering of a repeater or standoff jammer may be achieved, with possibly some increased complexity, by transmitting on the sum pattern and receiving on the signals received by horn 12b and the difference signals.

Figure 6:
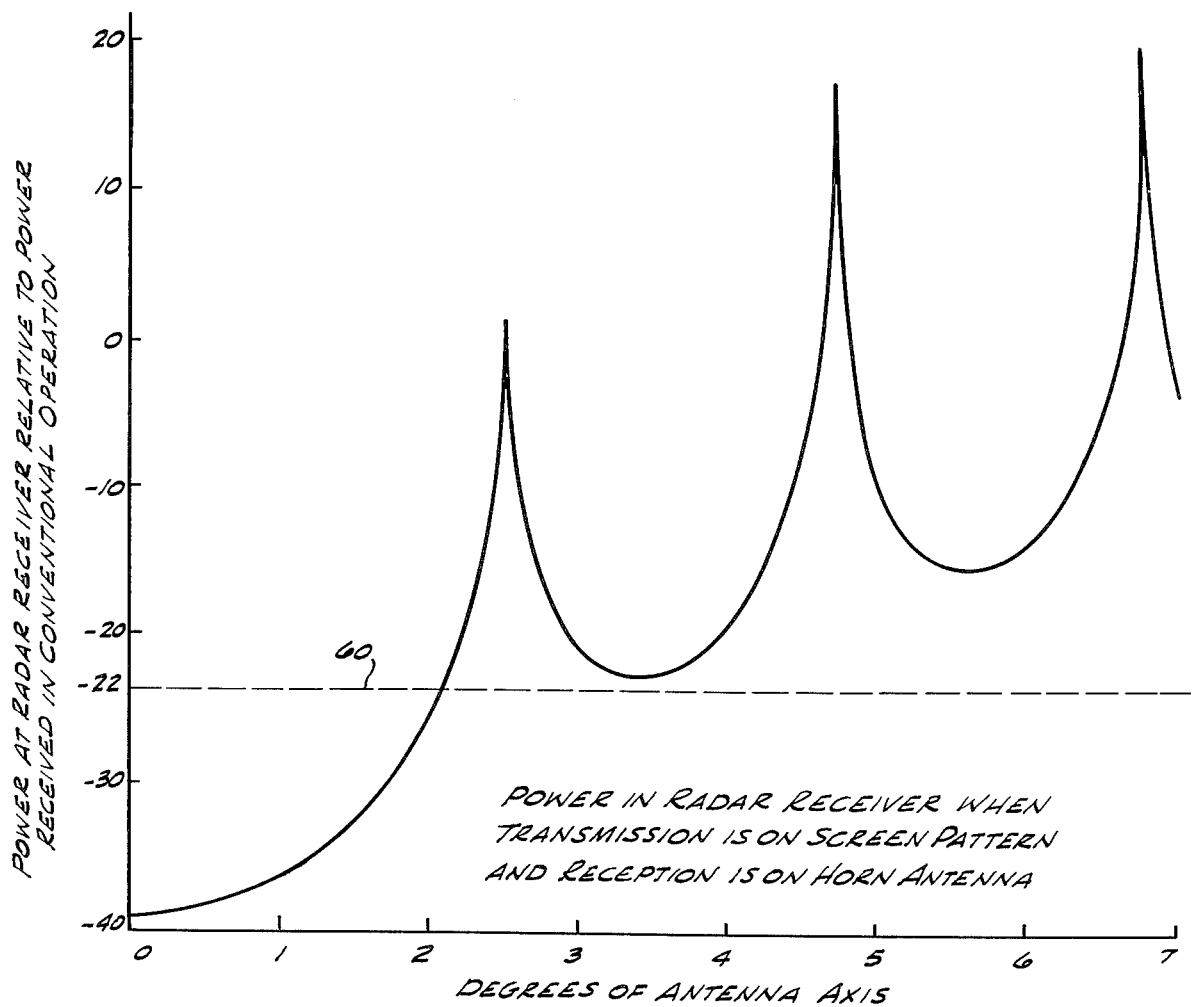
FIG. 6 is a diagram of power received by the receiver when reception is on the antenna horn relative to power received with reception on a sum pattern vs. degrees off antenna axis.

The power at the receiver when transmission is on the sum pattern and reception on the horn pattern relative to reception on the sum pattern is diagrammed in FIG. 6. As seen from FIG. 6, a threshold level indicated by line 60 may be established in the receiver so that only when the power of the reception on the horn pattern is less than −22 db relative to the power received on the conventional sum pattern, is the beam of the receiver display blanked. As a result, the repeater may be located within an azimuth range of 2° off the antenna axis. Similarly, the azimuth range or region which is affected by the standoff jammer, may be reduced to only a few degrees such as, for example, 2° on either side of the antenna axis.

Figure 7:
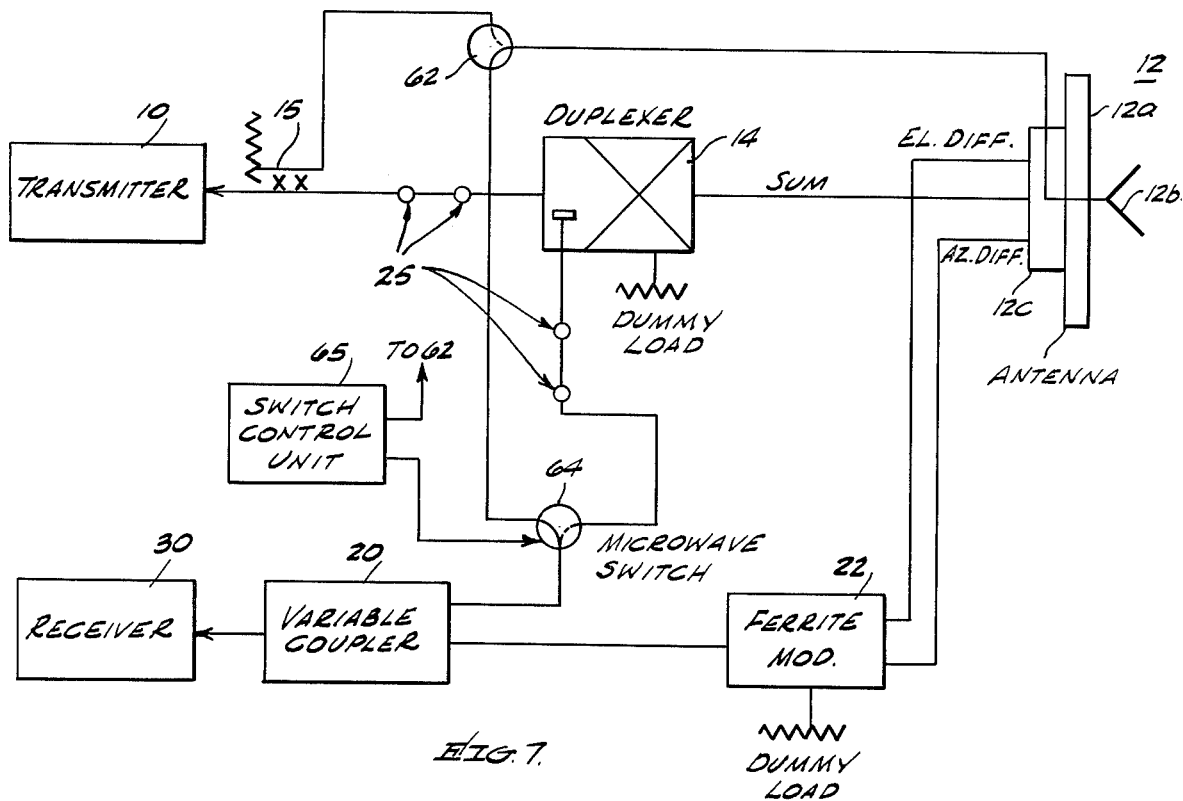
FIG. 7 is a block diagram of a conventional radar receiving system modified in accordance with another embodiment of the invention.

FIG. 7, to which reference is made herein, is a block diagram of the system capable of switching between a sum pattern reception and a horn pattern reception. Basically, in addition to the conventional radar system, two microwave switches 62 and 64 are included, controlled by a switch control unit 65. In the conventional mode of operation, the switches are in the positions indicated by the dashed lines. Then, upon detecting the presence of either type ECM, unit 65 switches switch 64 to the position indicated by the solid line therein, so that the reception of the sum pattern from the duplexer cannot be transferred to the variable coupler 20. On the other hand, switch 62 is switched during each transmission cycle to the dashed line position to couple the horn to the transmitter 10 via coupler 15. But during each reception cycle, the switch 62 is switched to the position indicated by the solid line therein to direct the received energy from horn 12b to coupler 20 through switch 64. The elevation and azimuth difference patterns are supplied to the coupler 20 through modulator 22 as in the conventional mode of reception. Thus the reception is on the horn pattern.

There has accordingly been shown and described herein a novel method of countering inverse gain sidelobe repeater and standoff jammers by varying the mode of reception from the employed for transmission. The switching capability is accomplished by incorporating switching means in a novel arrangement in an otherwise conventional search radar system. It is appreciated that those familiar with the art may make modifications in the arrangements as shown for explanatory purposes without departing from the spirit of the invention. Therefore, all such modifications and/or equivalents are deemed to fall within the scope of the invention as defined in the appended claims.

What is claimed is:

1. A radar system comprising
an antenna defining four quadrants;
a transmitter;
means for transmitting energy from said transmitter through said antenna, with the energy in said four quadrants in phase;
a receiver adapted to receive energy patterns received by said antenna; and
control means interposed between said receiver and said antenna and including microwave switching means, controllable by said control means to couple said receiver to said antenna to receive, in a conventional mode of reception, sum energy which is a function of the energy received in said four quadrants in phase, a first energy difference between the energy received in two quadrants defining the upper portion of said antenna and the energy received between two other quadrants defining the lower portion of said antenna, and a second energy difference between the energy received by two quadrants defining the right half of said antenna and the energy received by the other two quadrants defining the left half of said antenna, said control means further controlling said microwave switching means to couple said receiver to said antenna in a countering reception mode to receive energy which includes at least one of said energy differences.

2. The radar system as recited in claim 1 wherein said control means controls said microwave switching means in said countering reception mode to couple said receiver to said antenna so that said receiver receives said first energy differences representing an elevation energy difference pattern and said second energy difference representing an azimuth energy difference pattern.

3. The radar system as recited in claim 1 wherein said antenna includes a horn and said control means controls said microwave switching means in said countering reception mode to couple said antenna to said receiver to receive energy which is a function of the energy received by said horn and said first and second energy differences.

4. The method of countering the effect of either an inverse gain sidelobe repeater or a standoff jammer type ECM, the steps comprising
transmitting energy through a four quadrant antenna toward the ECM on a sum pattern;
receiving in a search mode energy on a sum pattern;
displaying the received energy; and
upon sensing the presence of either an inverse gain sidelobe repeater or standoff jammer, switching to a countering reception mode in which the energy displayed comprises energy received in other than a sum pattern.

5. The method as recited in claim 4 in which the displayed energy in said countering reception mode comprises energy of at least one difference pattern above a selected threshold level.

6. The method as recited in claim 4 in which the displayed energy in said countering reception mode comprises energy in an azimuth difference pattern and an elevation difference pattern.

7. The method as recited in claim 4 in which the displayed energy in said countering reception mode comprises energy received in a horn of a monopulse type antenna and elevation and azimuth difference patterns in said four quadrant antenna.

* * * * *